United States Patent [19]
Clark

[11] 3,822,827
[45] July 9, 1974

[54] METHOD OF MODIFYING CLAY PARTICLES

[76] Inventor: Norman Owen Clark, Tarton, Driving Ln., Par, Cornwall, England

[22] Filed: June 20, 1972

[21] Appl. No.: 264,433

[30] Foreign Application Priority Data
June 21, 1971 Great Britain............ 29066/71

[52] U.S. Cl. ................................................ 241/3
[51] Int. Cl. ............................................. B02c 19/00
[58] Field of Search ..................... 241/3, 5, 27, 29

[56] References Cited
UNITED STATES PATENTS
2,749,051  6/1956  Simenson.......................... 241/3
2,779,974  2/1957  Billing et al........................ 241/3
3,502,272  3/1970  Kellerwessel et al. ............ 241/3

*Primary Examiner*—Granville Y. Custer, Jr.
*Attorney, Agent, or Firm*—Armstrong, Nikaido & Wegner

[57] ABSTRACT

A process for modifying the particle size distribution of a fine particulate solid, such as a clay mineral, which process comprises the steps of compacting the fine particulate solid in a substantially dry state under a compressive force of at least 100 atmospheres to form a compacted mass, and thereafter breaking-up the compacted mass to obtain a fine particulate solid having a modified particle size distribution.

9 Claims, No Drawings

METHOD OF MODIFYING CLAY PARTICLES

BACKGROUND OF THE INVENTION

This invention relates to particulate solids and more particularly is concerned with a process for modifying the particle size of fine particulate solids, i.e. those consisting of particles having an ultimate particle size smaller than about 50 microns equivalent spherical diameter.

Fine particulate solids take the form of naturally occurring fine minerals; comminuted solids, including comminuted coarse minerals and other large-grained solid materials; and chemically-precipitated particulate solids. The particle size distribution of, for example, a fine mineral often determines the physical properties of the mineral, e.g. the optical properties thereof or the rheological properties of a suspension thereof in a liquid medium. For a given use of the mineral there is often an optimum particle size distribution which may be so critical that only small departures from the optimum can be tolerated. However, it is unlikely that a fine mineral having exactly the optimum particle size distribution for a particular purpose can be found in nature or that a coarser mineral can be simply ground to the desired particle size distribution. It is therefore frequently necessary to modify artificially the particle size distribution of fine particulate solids, such as, for example, naturally-occurring fine minerals and comminuted coarse minerals. This is particularly the case with fine particulate solids containing particles of colloidal size, i.e. ½ micron or smaller.

SUMMARY OF THE INVENTION

According to the present invention there is provided a process for modifying the particle size distribution of a fine particulate solid which process comprises the steps of compacting the fine particulate solid in a substantially dry state under a compressive force of at least 100 atmospheres to form a compacted mass, and thereafter breaking-up the compacted mass.

The breaking up of the compacted mass can be effected in a conventional pulverising mill, e.g. a hammer mill, a pin mill, a roller mill or a centrifugal attrition mill.

DESCRIPTION OF THE PREFERRED EMBODIMENTS

The process of the present invention is preferably carried out in two or more stages so that the steps of compacting the fine particulate solid under a compressive force of at least 100 atmospheres and breaking-up the compacted mass thus formed are advantageously repeated at least once. With such a procedure it is advantageous to subject the compacted mass, in the first stage, to a milling action for a time sufficient to break up the compacted mass into granules ranging in size from 50 to 200 microns. Furthermore, it may be advantageous in each stage to increase substantially the compressive force used to compact the fine particulate solid.

Preferably, the fine particulate solid is substantially completely dried before being subjected to the compressive force, the water content of the fine particulate solid being less than 2% and preferably less than 1% by weight. When the process is carried out in two or more stages care should be taken to ensure that no moisture is adsorbed by the granules between the compaction steps. Thus, for example, hot dry gas is advantageously passed through the pulverising mill whilst the compacted mass is being broken up.

The present invention has been found to be particularly suitable for treating clay minerals, but it can also be used with other fine minerals, such as calcium carbonate minerals, and with fine particulate solids in general.

The invention is illustrated by the following Examples.

EXAMPLE 1

A 53 g sample, (A), of a paper-coating quality English kaolin clay having an ultimate particle size distribution such that 78% by weight consisted of particles smaller than 2 microns equivalent spherical diameter (e.s.d.) and 61% by weight consisted of particles smaller than 1 micron e.s.d., and in the form of a finely-divided powder containing 0.6% by weight of water was packed as closely as possible into a flexible tube of plasticised PVC of length 90 mm and diameter 24 mm, each end of the tube being closed by means of a rubber bung. The flexible tube containing the clay was then immersed in oil in the chamber of an isostatic press and subjected to an isostatic pressure of 20,000 p.s.i. The pressure was then relaxed and the rod-like mass of compacted clay removed from the tube and broken up in a pestle and mortar to a powder. The powder was then dried at 110° C for 3 hours, and the ultimate particle size distribution of the dry powder was determined.

EXAMPLE 2

A second sample, (B), of the same kaolin clay was treated in a similar manner except that after the drying step the second sample was recompacted in the isostatic press to 20,000 p.s.i. After the first compacting step the rod-like mass was reduced to particles ranging in size from about 50 microns to about 200 microns, these particles then being dried at 110° C for 3 hours before being subjected to the second compaction step. The ultimate particle size distribution of the sample was determined after the second compaction step.

EXAMPLE 3

A third sample, (C), of the same kaolin clay was treated in a similar manner to sample (B) except that after the first drying step the third sample was recompacted to 40,000 p.s.i. The ultimate particle size distribution of the sample was determined after the second compaction step.

The results obtained for each of samples (A), (B) and (C) are given in the Table below.

TABLE

|  | % by weight smaller than | |
|---|---|---|
|  | 2 μm e.s.d. | 1 μm e.s.d. |
| Original clay | 78 | 61 |
| Example 1 | | |
| Sample (A) after treatment | 71 | 48 |
| Example 2 | | |
| Sample (B) | | |

| | | |
|---|---|---|
| after treatment | 70 | 47 |
| Example 3 | | |
| Sample (C) after treatment | 59 | 33 |

I claim:

1. A process for modifying the particle size distribution of a fine particulate solid clay which process comprises the steps of compacting the fine particulate solid clay in a substantially dry state under a compressive force of at least 100 atmospheres to form a compacted mass, and thereafter breaking-up the compacted mass.

2. A process according to claim 1, wherein the moisture content of the fine particulate solid clay is reduced to below 1% by weight before the fine particulate solid clay is subjected to the compressive force of at least 100 atmospheres.

3. A process according to claim 1, wherein the steps of compacting the fine particulate solid clay under a compressive force of at least 100 atmospheres and breaking-up the compacted mass thus formed are repeated at least once.

4. A process according to claim 3, wherein the compressive force employed to compact the fine particulate solid clay for the second and any subsequent time is substantially greater than the compressive force employed to compact the fine particulate solid for the first time.

5. A process according to claim 3, wherein the breaking-up of the compacted mass after the first application thereto of a compressive force of at least 100 atmospheres is effected in the presence of a hot dry gas.

6. A process for modifying the particle size distribution of a fine particulate solid clay, comprising the steps of compacting the fine particulate solid clay in a substantially dry state under a compressive force of at least 100 atmospheres to form a compacted mass, said compacting being repeated at least once; and thereafter breaking-up the compacted mass until the compacted mass is reduced to particles ranging in size from 50 microns to 200 microns.

7. A process according to claim 1, wherein the fine particulate solid clay is a clay mineral.

8. A process for modifying the particle size distribution of a clay mineral, which process comprises the steps of reducing the moisture content of the clay mineral to below 2% by weight, compacting the clay mineral under a compressive force of at least 100 atmospheres to form a compacted mass, and thereafter breaking-up the compacted mass.

9. A process for modifying the particle size distribution of a clay mineral, which process comprises the steps of reducing the moisture content of the clay mineral to below 2% by weight, compacting the clay mineral under a compressive force of at least 100 atmospheres to form a compacted mass, and thereafter breaking-up the compacted mass in the presence of a hot dry gas, said breaking-up being continued until there is formed a material consisting essentially of particles ranging in size from about 50 microns to about 200 microns, and wherein said material is recompacted under a compressive force of at least 100 atmospheres, and thereafter is broken-up to form a fine particulate clay.

* * * * *

UNITED STATES PATENT OFFICE
CERTIFICATE OF CORRECTION

Patent No. 3,822,827                    Dated July 9, 1974

Inventor(s) Norman Owen Clark

It is certified that error appears in the above-identified patent and that said Letters Patent are hereby corrected as shown below:

On the first page of patent, after "/76/": insert

--/73/ Assignee: English Clays Lovering Pochin & Company Limited, Cornwall, England--

Signed and sealed this 24th day of June 1975.

(SEAL)
Attest:

RUTH C. MASON
Attesting Officer

C. MARSHALL DANN
Commissioner of Patents
and Trademarks